United States Patent
Ye

(10) Patent No.: US 10,838,615 B2
(45) Date of Patent: Nov. 17, 2020

(54) METHOD FOR MOVING GRAPHICAL POINTER, SYSTEM FOR MOVING GRAPHICAL POINTER, AND TOUCH DISPLAY DEVICE

(71) Applicant: SHENZHEN ROYOLE TECHNOLOGIES CO. LTD., Guangdong (CN)

(72) Inventor: Zegang Ye, Guangdong (CN)

(73) Assignee: SHENZHEN ROYOLE TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/338,066

(22) PCT Filed: Oct. 9, 2016

(86) PCT No.: PCT/CN2016/101572
§ 371 (c)(1),
(2) Date: Mar. 29, 2019

(87) PCT Pub. No.: WO2018/064832
PCT Pub. Date: Apr. 12, 2018

(65) Prior Publication Data
US 2020/0026404 A1    Jan. 23, 2020

(51) Int. Cl.
*G06F 3/0488* (2013.01)
*G06F 3/0354* (2013.01)
(Continued)

(52) U.S. Cl.
CPC .......... *G06F 3/0488* (2013.01); *G06F 3/038* (2013.01); *G06F 3/03547* (2013.01);
(Continued)

(58) Field of Classification Search
CPC ...... G06F 3/0488; G06F 3/0485; G06F 3/038; G06F 3/03547; G06F 3/04812; G06F 3/04883
See application file for complete search history.

(56) References Cited

U.S. PATENT DOCUMENTS

| | | | |
|---|---|---|---|
| 2010/0177041 A1 | 7/2010 | Chen | |
| 2014/0300543 A1* | 10/2014 | Kim | G06F 3/04883 345/157 |
| 2014/0306897 A1* | 10/2014 | Cueto | G06F 3/04883 345/173 |

FOREIGN PATENT DOCUMENTS

| CN | 101276254 A | 10/2008 |
|---|---|---|
| CN | 103200304 A | 7/2013 |

(Continued)

OTHER PUBLICATIONS

International search report dated Jul. 11, 2017 from corresponding application No. PCT/CN2016/101572.

*Primary Examiner* — Temesghen Ghebretinsae
*Assistant Examiner* — Ivelisse Martinez Quiles
(74) *Attorney, Agent, or Firm* — Hauptman Ham, LLP

(57) ABSTRACT

Disclosed are a method for moving a graphical pointer, and a touch display device. The method includes the following. Whether a sliding touch operation is executed on a touch display device is determined. Touch time of each of at least three consecutive touch points is obtained when the sliding touch operation is executed on the touch display device. A variation of a speed of the sliding touch operation is determined according to the touch time of each of the at least three consecutive touch points. A movement speed of the graphical pointer displayed on the touch display device is increased when the speed of the sliding touch operation is (Continued)

increased. The movement speed of the graphical pointer is decreased when the speed of the sliding touch operation is decreased.

20 Claims, 6 Drawing Sheets

(51) Int. Cl.
  *G06F 3/038* (2013.01)
  *G06F 3/0485* (2013.01)
  *G06F 3/0481* (2013.01)
(52) U.S. Cl.
  CPC ........ *G06F 3/0485* (2013.01); *G06F 3/04812* (2013.01); *G06F 3/04883* (2013.01)

(56) References Cited

FOREIGN PATENT DOCUMENTS

| | | |
|---|---|---|
| CN | 103677593 A | 3/2014 |
| CN | 104317513 A | 1/2015 |

* cited by examiner

METHOD FOR MOVING GRAPHICAL POINTER, SYSTEM FOR MOVING GRAPHICAL POINTER, AND TOUCH DISPLAY DEVICE

RELATED APPLICATION

The present application is a National Phase of International Application Number PCT/CN2016/101572, filed Oct. 9, 2016.

TECHNICAL FIELD

The present disclosure relates to the field of touch display, and particularly to a method for moving a graphical pointer, a system for moving a graphical pointer, and a touch display device.

BACKGROUND

Touch display devices include display devices having a touch screen, such as smart phones, tablet computers, and the like, and further include display devices having a touch pad, such as laptop computers and the like. In the touch display devices, head-mounted display devices may include the touch screen, and may also include the touch pad. For the display devices having the touch pad, a graphical pointer (e.g., a graphical cursor, a mouse pointer, a focus display on an operation item, or the like) is usually displayed for guiding input. For the display device having the touch screen such as an immersive head-mounted display device (after wearing the display device, a user just can view display content and cannot see a touch position touched by a finger), the graphical pointer needs to be displayed on a display interface to guide input. A movement speed of the pointer can be set by adjusting a progress bar of "pointer's movement speed" in a device driver, and is set by virtue of manual intervention before usage. With the same movement speed of the graphical pointer, duration of a movement of the graphical pointer when the graphical pointer needs to be moved substantially to execute a selection operation is longer than that of the movement of the graphical pointer when the graphical pointer is moved slightly to realize positioning, thereby reducing usage efficiency. In contrast, with the same movement speed of the graphical pointer, when the graphical pointer needs to be moved slightly to execute a selection operation, a range of the movement of the graphical pointer is much less, thus accurate positioning may not be realized by the pointer, and a positioning operation may be repeated in a region adjacent to a target position, thereby reducing user work efficiency. However, in the related art, the movement speed of the graphical pointer cannot be adjusted adaptively during a touch operation, thereby affecting user experience.

SUMMARY

In view of the above problems, an embodiment of the present disclosure provide a method for moving a graphical pointer, a system for moving a graphical pointer, and a touch display device, to provide better user experience when a user controls a movement of a graphical pointer through a touch operation.

The embodiment of the present disclosure provides a method for moving a graphical pointer. The method includes the following. Whether a sliding touch operation is executed on a touch display device is determined. Touch time of each of at least three consecutive touch points is obtained when the sliding touch operation is executed on the touch display device. A variation of a speed of the sliding touch operation is determined according to the touch time of each of the at least three consecutive touch points. A movement speed of the graphical pointer displayed on the touch display device is increased when the speed of the sliding touch operation is increased. The movement speed of the graphical pointer is decreased when the speed of the sliding touch operation is decreased.

The embodiment of the present disclosure provides a system for moving a graphical pointer. The system includes a touch operation determination module, a touch speed determination module, and a movement speed control module. The touch operation determination module is configured to determine whether a sliding touch operation is executed on a touch display device. The touch speed determination module is configured to obtain touch time of each of at least three consecutive touch points when the sliding touch operation is executed on the touch display device, and to determine a variation of a speed of the sliding touch operation according to the touch time of each of the at least three consecutive touch points. The movement speed control module is configured to increase a movement speed of the graphical pointer displayed on the touch display device when the speed of the sliding touch operation is increased, and to decrease the movement speed of the graphical pointer when the speed of the sliding touch operation is decreased.

The embodiment of the present disclosure provides a touch display device. The touch display device includes a memory storing a set of program codes and a processor configured to invoke the set of program codes to perform following operations. Whether a sliding touch operation is executed on the touch display device is determined. Touch time of each of at least three consecutive touch points is obtained when the sliding touch operation is executed on the touch display device. A variation of a speed of the sliding touch operation is determined according to the touch time of each of the at least three consecutive touch points. A movement speed of the graphical pointer displayed on the touch display device is increased when the speed of the sliding touch operation is increased. The movement speed of the graphical pointer is decreased when the speed of the sliding touch operation is decreased.

In the embodiment, according to the obtained touch time of each of the consecutive touch points, whether the speed of the sliding touch operation is increased or decreased can be determined. When the speed of the sliding touch operation is increased, correspondingly, the movement speed of the graphical pointer is increased, such that the graphical pointer can be moved substantially to execute a selection operation, thereby reducing duration of a movement of the graphical pointer. When the speed of the sliding touch operation is decreased, correspondingly, the movement speed of the graphical pointer is decreased, such that the graphical pointer can be moved slightly to execute a selection operation, thereby realizing accurate positioning. In the embodiment, the movement speed of the graphical pointer can be adjusted adaptively according to the speed of the sliding touch operation, thereby increasing user work efficiency, and improving user experience.

BRIEF DESCRIPTION OF THE DRAWINGS

In order to illustrate technical solutions in embodiments of the present disclosure more clearly, the following briefly introduces the accompanying drawings required for describing the embodiments. Apparently, the accompanying drawings in the following description merely illustrate some embodiments of the present disclosure. Those of ordinary skill in the art may also obtain other drawings based on these accompanying drawings without creative work.

DETAILED DESCRIPTION

Below technical solutions of embodiments of the present disclosure will be described clearly and completely in conjunction with the accompanying drawings of the embodiments of the present disclosure. Apparently, some but not all of embodiments of the present disclosure are described. Based on the embodiments of the present disclosure, all the other embodiments, which a person ordinarily skilled in the art may obtain without paying creative work, fall within the scope of protection of the present disclosure.

Figure 1:
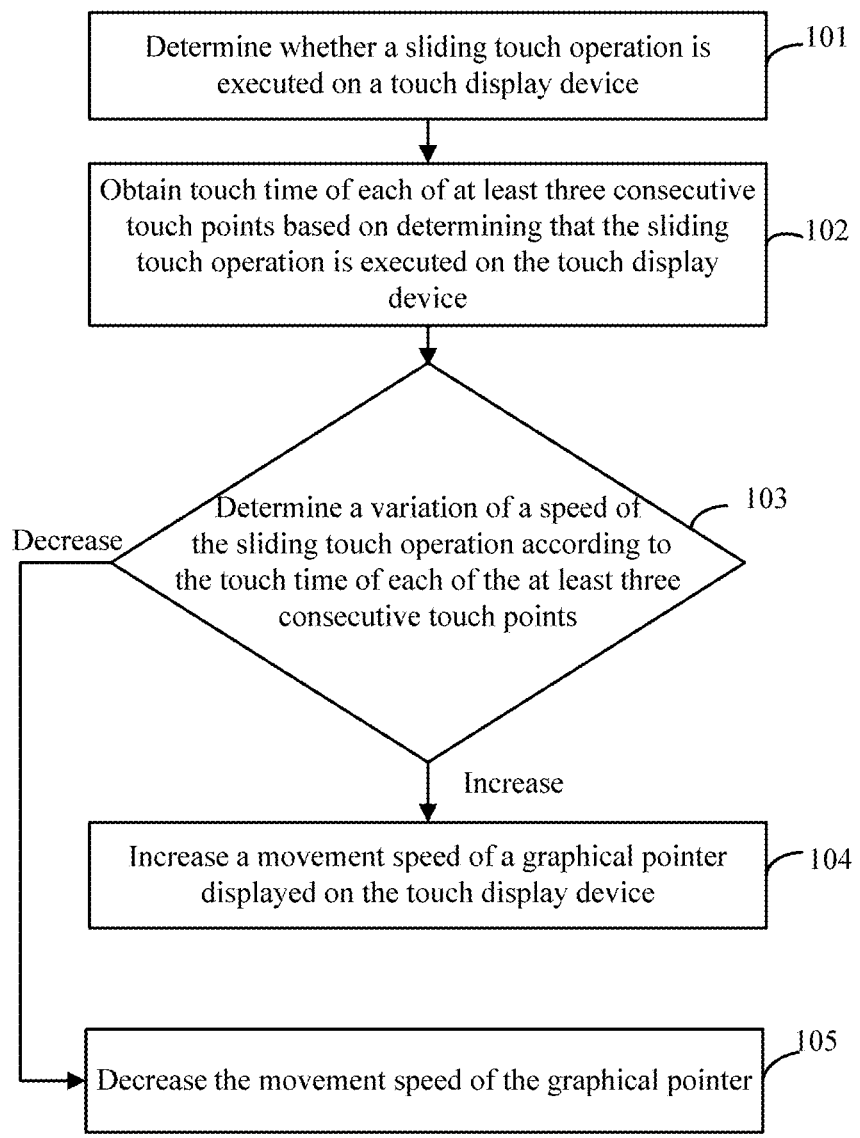
FIG. 1 is a schematic flow chart illustrating a method for moving a graphical pointer according to an embodiment of the present disclosure.

Referring to FIG. 1, a method for moving a graphical pointer according to an embodiment of the present disclosure is illustrated. The method for moving the graphical pointer is applied to a touch display device, and the graphical pointer is displayed on the touch display device. The touch display device may be a display device having a touch screen or a display device having a touch pad, such as a laptop computer, a tablet computer, a smart phone, a head-mounted display device, or the like. The method for moving the graphical pointer includes the following.

Step 101, whether a sliding touch operation is executed on the touch display device is determined.

Specifically, the sliding touch operation may be executed on a touch screen or a touch pad. When multiple consecutive touch points of the touch display device are detected to be touched, it is determined that the sliding touch operation is executed on the touch display device.

Step 102, when the sliding touch operation is executed on the touch display device, touch time of each of at least three consecutive touch points is obtained.

Specifically, when one touch point of the touch display device is detected to be touched, a touch signal is generated, and system time at which the touch signal is generated is recorded as the touch time of the touch point. That is, the touch time of one touch point is a point-in-time at which the touch point is detected to be touched.

Step 103, a variation of a speed of the sliding touch operation is determined according to the touch time of each of the at least three consecutive touch points. When the speed of the sliding touch operation is increased, step 104 is executed; when the speed of the sliding touch operation is decreased, step 105 is executed.

In an implementation, according to the touch time of each of the at least three consecutive touch points, the variation of the speed of the sliding touch operation is determined as follows. According to touch time of a first touch point, touch time of a second touch point, and touch time of a third touch point, a first touch time interval between the touch time of the first touch point and the touch time of the second touch point and a second touch time interval between the touch time of the second touch point and the touch time of the third touch point are calculated, where the first touch point, the second touch point, and the third touch point are three consecutive touch points arranged in a direction of the sliding touch operation. When the first touch time interval is longer than the second touch time interval, it is determined that the speed of the sliding touch operation is increased; when the first touch time interval is shorter than the second touch time interval, it is determined that the speed of the sliding touch operation is decreased. For example, it is assumed that the touch time of the first touch point is T1, the touch time of the second touch point is T2, and the touch time of the third touch point is T3, the first touch time interval $\Delta t1$ is T2-T1, and the second touch time interval $\Delta t2$ is T3-T2. If $\Delta t1$ is longer than $\Delta t2$, it indicates that the touch speed is increased; if $\Delta t1$ is shorter than $\Delta t2$, it indicates that the touch speed is decreased. In this manner, the variation of the speed of the sliding touch operation can be determined, for example, the speed may be continuously increased, or may be first increased and then decreased, or may be first increased, then decreased and finally increased, or the like. In the implementation, the variation of the speed of the sliding touch operation can be accurately determined.

What needs to be illustrated is that, herein the first touch time interval being longer than the second touch time interval does not mean that the first touch time interval is necessarily longer than the second touch time interval, and the first touch time interval being shorter than the second time touch interval does not mean that the first touch time interval is necessarily shorter than the second touch time interval, that is to say, when the first touch time interval is very close to the second touch time interval, it can be deemed that the first touch time interval is equal to the second touch time interval. The touch display device can set a numeric range according to touch accuracy, and when an absolute difference between the first touch time interval and the second touch time interval falls within the numeric range, it can be deemed that the first touch time interval is equal to the second touch time interval. The present embodiment is not limited to a specific numeric range.

In another implementation, when the sliding touch operation is executed on the touch display device, touch time of each of three or more consecutive touch points arranged in the direction of the sliding touch operation is obtained. For example, the touch time of each of the touch points from the fifth touch point to the tenth touch point is obtained, and sequentially, a touch time interval between each two adjacent touch points is calculated. For example, the touch time interval between the touch time of the sixth touch point and the touch time of the fifth touch point, the touch time interval between the touch time of the seventh touch point and the touch time of the sixth touch point and so on are calculated sequentially. When the touch time intervals are gradually shortened, it is determined that the speed of the sliding touch operation is gradually increased. When the touch time intervals are gradually prolonged, it is determined that the speed of the sliding touch operation is gradually decreased.

Step 104, a movement speed of the graphical pointer displayed on the touch display device is increased.

Specifically, the graphical pointer may be any graphical pointer for guiding input, for example, a graphical cursor, a mouse pointer, a focus display on an operation item, or the like.

In an implementation, the movement speed of the graphical pointer may be increased as follows. A time difference between the first touch time interval and the second touch time interval is calculated. A corresponding movement speed adjustment coefficient is determined according to a first mapping relation, where the first mapping relation is preset, and is a mapping relation between time difference ranges and movement speed adjustment coefficients, each time difference range corresponds to one movement speed adjustment coefficient, and each movement speed adjustment coefficient corresponding to one time difference range is larger than 1. The movement speed of the graphical pointer is increased according to the corresponding movement speed adjustment coefficient. For example, when the corresponding movement speed adjustment coefficient is 2, the current movement speed of the graphical pointer is doubled to obtain an adjusted movement speed. Obviously, the adjusted movement speed is higher than the movement speed before adjustment. After the movement speed of the graphical pointer is increased, the graphical pointer can be moved substantially to execute a selection operation, such that duration of a movement of the graphical pointer can be reduced, thereby increasing user work efficiency, and improving user experience. In the implementation, when the speed of the sliding touch operation is gradually increased, the movement speed of the graphical pointer is gradually increased, thus the graphical pointer can be moved to a target position quickly.

In another implementation, the movement speed of the graphical pointer can be increased as follows. The movement speed of the graphical pointer is increased by a preset amplitude. For example, the movement speed of the graphical pointer is doubled. That is to say, in the implementation, the movement speed adjustment coefficient is a fixed value such as 2. After the movement speed of the graphical pointer is increased, the graphical pointer can be moved substantially to execute a selection operation, such that the duration of the movement of the graphical pointer can be reduced, thereby increasing the user work efficiency, and improving the user experience.

Step 105, the movement speed of the graphical pointer is decreased.

In an implementation, the movement speed of the graphical pointer is decreased as follows. The time difference between the first touch time interval and the second touch time interval is calculated. A corresponding movement speed adjustment coefficient is determined according to a second mapping relation, where the second mapping relation is preset, and is a mapping relation between time difference ranges and movement speed adjustment coefficients, each time difference range corresponds to one movement speed adjustment coefficient, and each movement speed adjustment coefficient corresponding to one time difference range is smaller than 1. The movement speed of the graphical pointer is decreased according to the corresponding movement speed adjustment coefficient. When the corresponding movement speed adjustment coefficient is 0.5, the current movement speed of the graphical pointer is decreased by 50% to obtain an adjusted movement speed. Obviously, the adjusted movement speed is lower than the movement speed before adjustment. After the movement speed of the graphical pointer is decreased, the graphical pointer can be moved slightly to execute a selection operation, such that accurate positioning can be realized, thereby increasing the user work efficiency, and improving the user experience. In the implementation, when the speed of the sliding touch operation is gradually decreased, the movement speed of the graphical pointer is also gradually decreased, thus the graphical pointer can be accurately moved to a target position.

In another implementation, the movement speed of the graphical pointer is decreased as follows. The movement speed of the graphical pointer is decreased by a preset amplitude. For example, the movement speed of the graphical pointer is reduced by 50%. That is to say, in the implementation, the movement speed adjustment coefficient is a fixed value such as 0.5. After the movement speed of the graphical pointer is decreased, the graphical pointer can be moved slightly to execute a selection operation, such that accurate positioning can be realized, thereby increasing the user work efficiency, and improving the user experience.

Certainly, when the first touch time interval is equal to the second touch time interval, that is, the touch speed is constant, the movement speed of the graphical pointer can also be kept unchanged.

In the embodiment, according to the obtained touch time of each of the consecutive touch points, whether the speed of the sliding touch operation is increased or decreased can be determined. When the speed of the sliding touch operation is increased, correspondingly, the movement speed of the graphical pointer is increased, such that the graphical pointer can be moved substantially to execute a selection operation, thereby reducing the duration of the movement of the graphical pointer. When the speed of the sliding touch operation is decreased, correspondingly, the movement speed of the graphical pointer is decreased, such that the graphical pointer can be moved slightly to execute a selection operation, thereby realizing accurate positioning. In the embodiment, the movement speed of the graphical pointer can be adjusted adaptively according to the speed of the sliding touch operation, thereby increasing the user work efficiency, and improving the user experience.

Figure 2A:
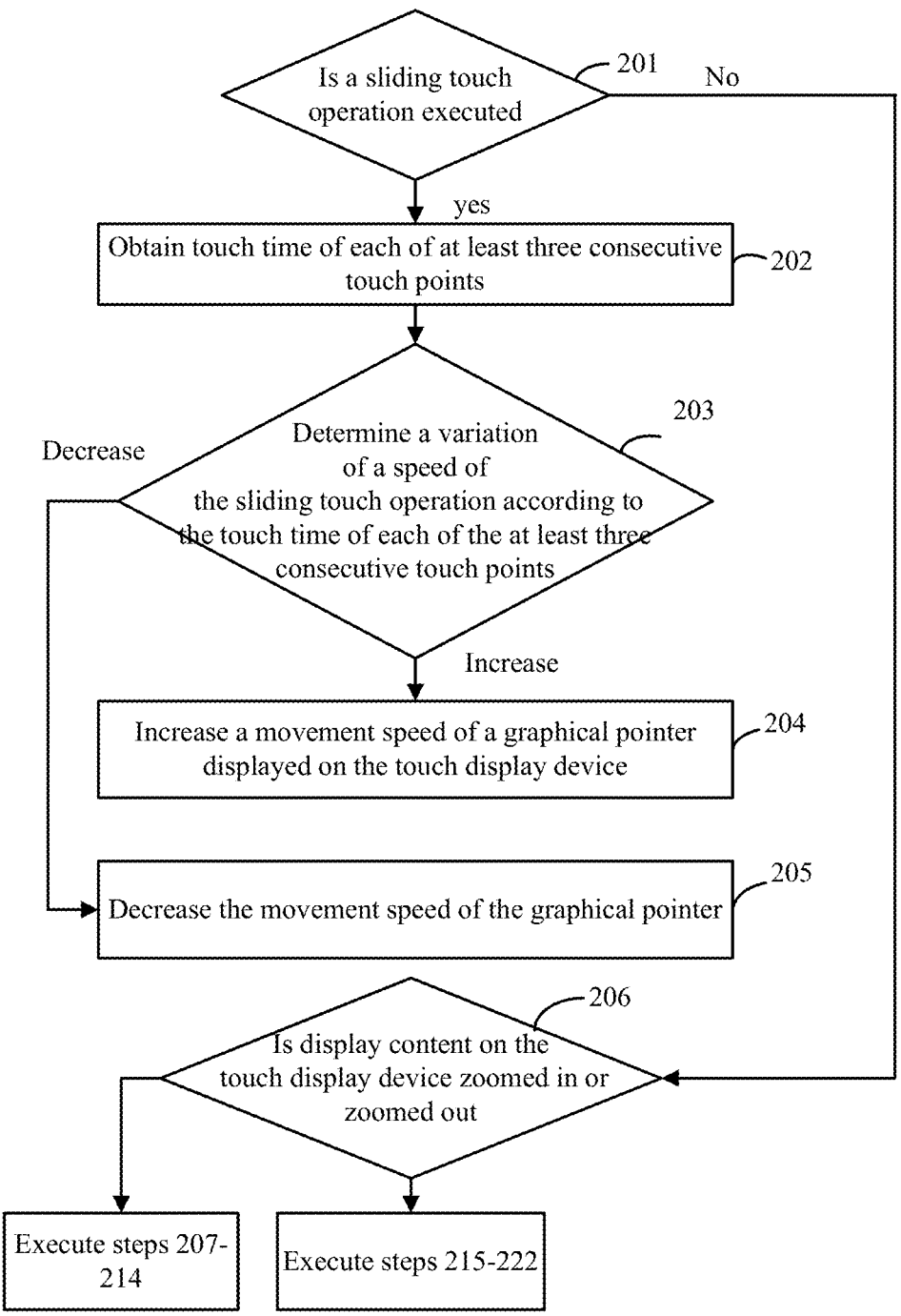
FIGS. 2A-2C are schematic flow charts illustrating a method for moving a graphical pointer according to another embodiment of the present disclosure.
Figure 2B:
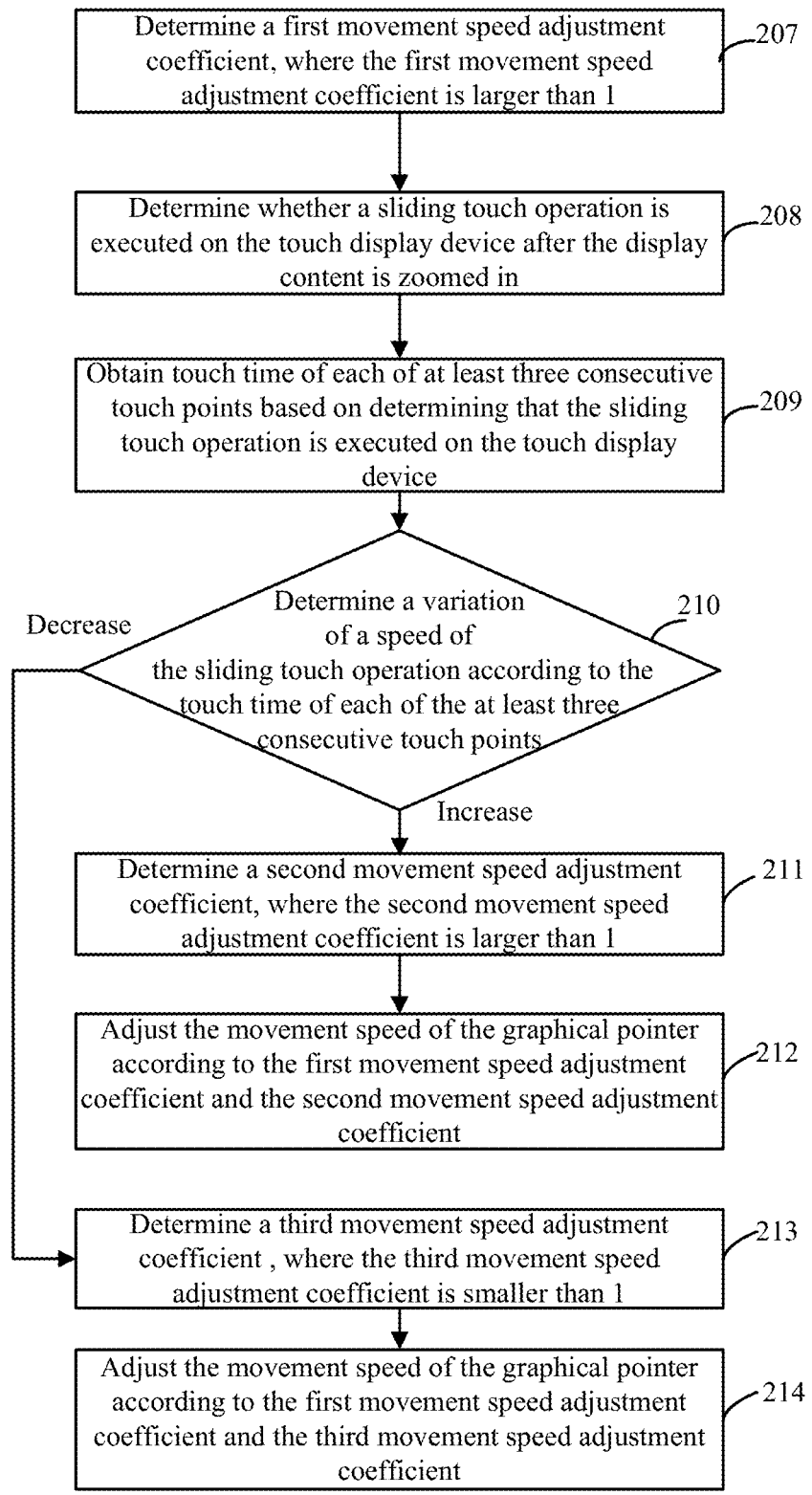
Figure 2C:
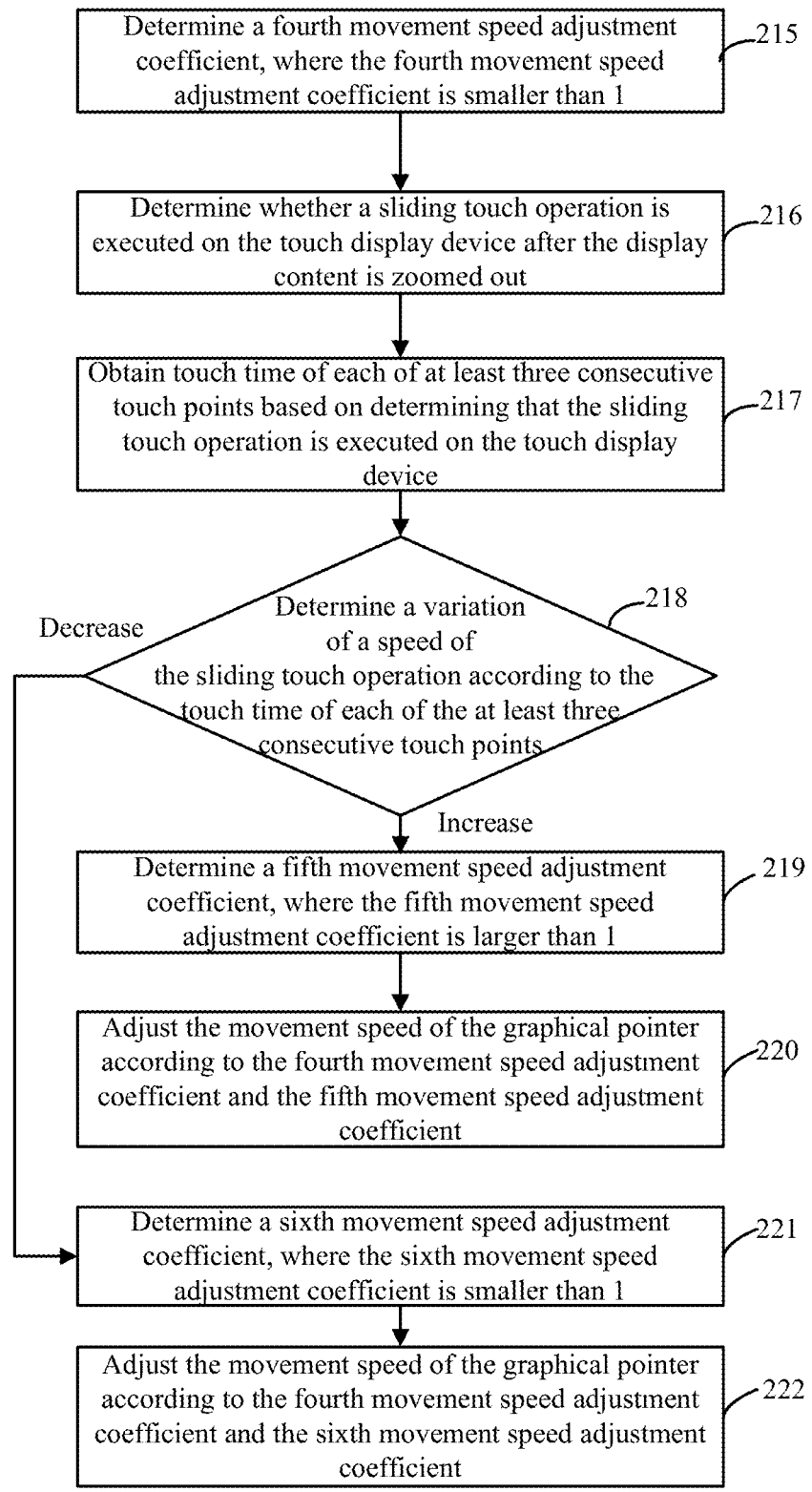

Referring to FIGS. 2A-2C, a method for moving a graphical pointer according to another embodiment of the embodiment is illustrated. The method for moving the graphical pointer includes the following.

Step 201, whether a sliding touch operation is executed on a touch display device is determined. When the sliding touch operation is executed, step 202 is executed; otherwise, step 206 is executed.

Step 202, touch time of each of at least three consecutive touch points is obtained.

Step 203, a variation of a speed of the sliding touch operation is determined according to the touch time of each of the at least three consecutive touch points. When the speed of the sliding touch operation is increased, step 204 is executed; when the speed of the sliding touch operation is decreased, step 205 is executed.

Step 204, a movement speed of the graphical pointer displayed on the touch display device is increased.

Step 205, the movement speed of the graphical pointer is decreased.

Illustration of steps 201-205 are the same as that of steps 101-105, respectively, and details are not repeated herein.

Step 206, whether display content on the touch display device is zoomed in or zoomed out is determined. When the display content is zoomed in, step 207 is executed; when the display content is zoomed out, step 215 is executed.

Generally, after a web page, an office document (e.g., a word document) or the like is zoomed in or zoomed out, display content thereof is zoomed in or zoomed out, but a page frame is not zoomed in or zoomed out. However, when a picture is zoomed in or zoomed out, content thereof and an outer frame of the picture are both zoomed in or zoomed out. No matter whether the outer frame can be zoomed in or zoomed out, after content thereof is zoomed in or zoomed out, a display resolution is changed. Whether the display content is zoomed in or zoomed out can be determined according to such change of the display content. Certainly, whether the display content is zoomed in or zoomed out can also be determined by determining whether a zoom in operation or a zoom out operation is executed. What needs to be illustrated is that the touch display device can determine which operation is the zoom in operation and which operation is the zoom out operation. For example, when spreading two fingers on the touch display device, it is determined that the zoom in operation is executed; when pinching two fingers on the touch display device, it is determined that the zoom out operation is executed, and not all examples are illustrated herein.

Step 207, a first movement speed adjustment coefficient is determined, where the first movement speed adjustment coefficient is larger than 1.

The first movement speed adjustment coefficient can be determined as follows. A zoom in proportion of the display content is calculated. The first movement speed adjustment coefficient is determined according a third mapping relation, where the third mapping relation is preset, and is a mapping relation between zoom in proportion ranges and movement speed adjustment coefficients, each zoom in proportion range corresponds to one movement speed adjustment coefficient, and each movement speed adjustment coefficient corresponding to one zoom in proportion range is larger than 1.

Alternatively, a display resolution of the display content before the zoom in operation and a display resolution of the display content after the zoom in operation can be obtained. For example, when the display resolution before the zoom in operation is 1600×1200, the display resolution after the zoom in operation is 640×480, that is, the number of pixels displayed horizontally before the zoom in operation is 1600, and the number of pixels displayed vertically before the zoom in operation is 1200; the number of pixels displayed horizontally after the zoom in operation is 640, and the number of pixels displayed vertically after the zoom in operation is 480. The zoom in proportion can be set to be a proportion of the number of the pixels displayed horizontally before the zoom in operation to the number of the pixels displayed horizontally after the zoom in operation. Certainly, the zoom in proportion can also be set to be a proportion of the number of the pixels displayed vertically before the zoom in operation to the number of the pixels displayed vertically after the zoom in operation.

Alternatively, after the zoom in operation, if a display window changes in size, a size of the display window before the zoom in operation and a size of the display window after the zoom in operation can be obtained through a window manager. The zoom in proportion can be set to be a proportion of a length of the display window after the zoom in operation to a length of the display window before the zoom in operation, and can also be set to be a proportion of a height of the display window after the zoom in operation to a height of the display window before the zoom in operation.

Step 208, after the display content is zoomed in, whether a sliding touch operation is executed on the touch display device is determined.

Step 209, when the sliding touch operation is executed on the touch display device, touch time of each of at least three consecutive touch points is obtained.

Step 210, a variation of a speed of the sliding touch operation is determined according to the touch time of each of the at least three consecutive touch points. When the speed of the sliding touch operation is increased, step 211 is executed; when the speed of the sliding touch operation is decreased, step 213 is executed.

Step 211, a second movement speed adjustment coefficient is determined, where the second movement speed adjustment coefficient is larger than 1.

A specific implementation manner in which the second movement speed adjustment coefficient is determined is the same as that in which the corresponding movement speed adjustment coefficient is determined in step 104, and details are not repeated herein.

Step 212, the movement speed of the graphical pointer is adjusted according to the first movement speed adjustment coefficient and the second movement speed adjustment coefficient.

According to the first movement speed adjustment coefficient and the second movement speed adjustment coefficient, the movement speed of the graphical pointer is adjusted as follows. A total adjustment coefficient is obtained by adding up the first movement speed adjustment coefficient and the second movement speed adjustment coefficient. The movement speed of the graphical pointer is adjusted according to the total adjustment coefficient.

Step 213, a third movement speed adjustment coefficient is determined, where the third movement speed adjustment coefficient is smaller than 1.

A specific implementation manner in which the third movement speed adjustment coefficient is determined is the same as that in which the corresponding movement speed adjustment coefficient is determined in step 105, and details are not repeated herein.

Step 214, the movement speed of the graphical pointer is adjusted according to the first movement speed adjustment coefficient and the third movement speed adjustment coefficient.

According to the first movement speed adjustment coefficient and the third movement speed adjustment coefficient, the movement speed of the graphical pointer is adjusted as follows. A total adjustment coefficient is obtained by adding up the first movement speed adjustment coefficient and the third movement speed adjustment coefficient. The movement speed of the graphical pointer is adjusted according to the total adjustment coefficient.

Step 215, a fourth movement speed adjustment coefficient is determined, where the fourth movement speed adjustment coefficient is smaller than 1.

The fourth movement speed adjustment coefficient can be determined as follows. A zoom out proportion of the display content is calculated. The fourth movement speed adjustment coefficient is determined according a fourth mapping relation, where the fourth mapping relation is preset, and is a mapping relation between zoom out proportion ranges and movement speed adjustment coefficients, each zoom out proportion range corresponds to one movement speed adjustment coefficient, and each movement speed adjustment coefficient corresponding to one zoom out proportion range is smaller than 1.

Alternatively, a display resolution of the display content before a zoom out operation and a display resolution of the display content after the zoom out operation are obtained. For example, when the display resolution before the zoom out operation is 640×480, the display resolution after the zoom out operation is 1600×1200, that is, the number of pixels displayed horizontally before the zoom out operation is 640, and the number of pixels displayed vertically before the zoom out operation is 480; the number of pixels displayed horizontally after the zoom out operation is 1600, and the number of pixels displayed vertically after the zoom out operation is 1200. The zoom out proportion can be set to be a proportion of the number of the pixels displayed horizontally before the zoom out operation to the number of the pixels displayed horizontally after the zoom out operation. Certainly, the zoom out proportion can also be set to be a proportion of the number of the pixels displayed vertically before the zoom out operation to the number of the pixels displayed vertically after the zoom out operation.

Alternatively, after the zoom out operation, if the display window changes in size, a size of the display window before the zoom out operation and a size of the display window after the zoom out operation can be obtained through the window manager. The zoom out proportion can be set to be a proportion of a length of the display window after the zoom out operation to a length of the display window before the zoom out operation, and can also be set to be a proportion of a height of the display window after the zoom out operation to a height of the display window before the zoom out operation.

Step 216, after the display content is zoomed out, whether a sliding touch operation is executed on the touch display device can be determined.

Step 217, when the sliding touch operation is executed on the touch display device, touch time of each of at least three consecutive touch points is obtained.

Step 218, a variation of a speed of the sliding touch operation is determined according to the touch time of each of the at least three consecutive touch points. When the speed of the sliding touch operation is increased, step 219 is executed; when the speed of the sliding touch operation is decreased, step 221 is executed.

Step 219, a fifth movement speed adjustment coefficient is determined, where the fifth movement speed adjustment coefficient is larger than 1.

A specific implementation manner in which the fifth movement speed adjustment coefficient is determined is the same as that in which the corresponding movement speed adjustment coefficient is determined in step 104, and details are not repeated herein.

Step 220, the movement speed of the graphical pointer is adjusted according to the fourth movement speed adjustment coefficient and the fifth movement speed adjustment coefficient.

According to the fourth movement speed adjustment coefficient and the fifth movement speed adjustment coefficient, the movement speed of the graphical pointer can be adjusted as follows. A total adjustment coefficient is obtained by adding up the fourth movement speed adjustment coefficient and the fifth movement speed adjustment coefficient. The movement speed of the graphical pointer is adjusted according to the total adjustment coefficient.

Step 221, a sixth movement speed adjustment coefficient is determined, where the sixth movement speed adjustment coefficient is smaller than 1.

A specific implementation manner in which the sixth movement speed adjustment coefficient is determined is the same as that in which the corresponding movement speed adjustment coefficient is determined in step 105, and details are not repeated herein.

Step 222, the movement speed of the graphical pointer is adjusted according to the fourth movement speed adjustment coefficient and the sixth movement speed adjustment coefficient.

According to the fourth movement speed adjustment coefficient and the sixth movement speed adjustment coefficient, the movement speed of the graphical pointer can be adjusted as follows. A total adjustment coefficient is obtained by adding up the fourth movement speed adjustment coefficient and the sixth movement speed adjustment coefficient. The movement speed of the graphical pointer is adjusted according to the total adjustment coefficient.

In the embodiment, according to the obtained touch time of each of the consecutive touch points, whether the speed of the sliding touch operation is increased or decreased can be determined. When the speed of the sliding touch operation is increased, correspondingly, the movement speed of the graphical pointer is increased, such that the graphical pointer can be moved substantially to execute a selection operation, thereby reducing duration of a movement of the graphical pointer. When the speed of the sliding touch operation is decreased, correspondingly, the movement speed of the graphical pointer is decreased, such that the graphical pointer can be moved slightly to execute a selection operation, thereby realizing accurate positioning. In the embodiment, the movement speed of the graphical pointer can be adjusted adaptively according to the speed of the sliding touch operation, thereby increasing user work efficiency, and improving user experience.

Furthermore, when the sliding touch operation is executed after the display content is zoomed in or zoomed out, according to the movement speed adjustment coefficient obtained due to the zoom in operation or the zoom out operation and the movement speed adjustment coefficient obtained according to the variation of the speed of the sliding touch operation, the movement speed of the graphical pointer is determined, such that the movement speed of the graphical pointer can adapt to the change of the display content, thereby reducing the duration of the movement of the graphical pointer when the graphical pointer is moved substantially to execute a selection operation, and realizing accurate positioning when the graphical pointer is moved slightly to execute a selection operation. Therefore, in the embodiment, the user work efficiency can be increased, and the user experience can be improved.

Figure 3:
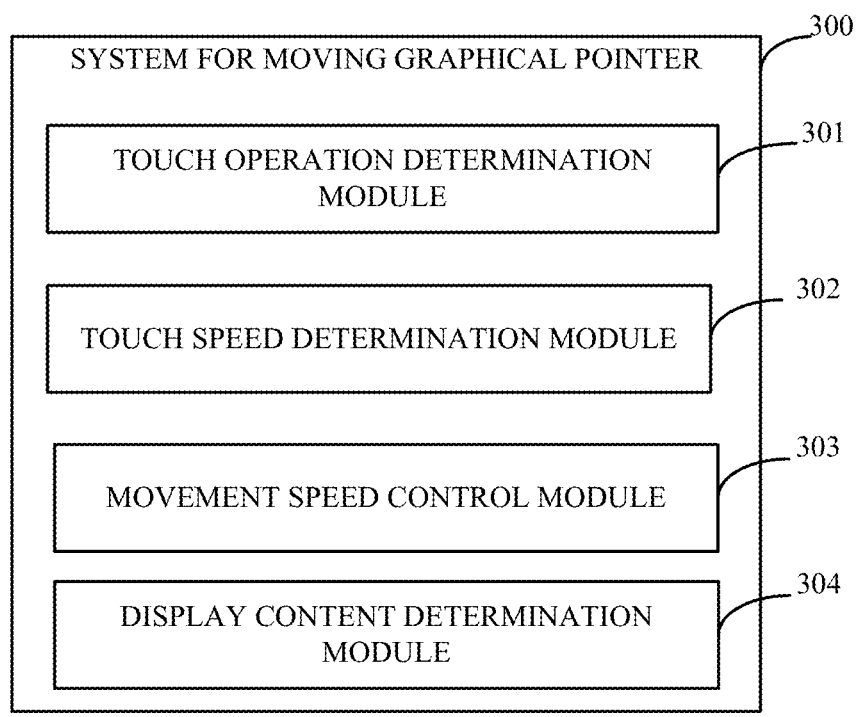
FIG. 3 is a basic structural diagram illustrating a system for moving a graphical pointer according to an embodiment of the present disclosure.

Referring to FIG. 3, a system for moving a graphical pointer according to an embodiment of the present disclosure is illustrated. The system 300 for moving the graphical pointer illustrated in FIG. 3 is applied to a touch display device, and the graphical pointer is displayed on the touch display device. The touch display device may be a display device having a touch screen or a display device having a touch pad, such as a laptop computer, a tablet computer, a smart phone, a head-mounted display device, or the like. The system 300 for moving the graphical pointer includes a touch operation determination module 301, a touch speed determination module 302, and a movement speed control module 303.

The touch operation determination module 301 is configured to determine whether a sliding touch operation is executed on the touch display device.

Specifically, the sliding touch operation may be executed on a touch screen or a touch pad. When multiple consecutive touch points of the touch display device are detected to be touched, the touch operation determination module 301 determines that the sliding touch operation is executed on the touch display device.

The touch speed determination module 302 is configured to obtain touch time of each of at least three consecutive touch points when the sliding touch operation is executed on the touch display device.

Specifically, when one touch point of the touch display device is detected to be touched, a touch signal is generated, and the touch speed determination module 302 records system time at which the touch signal is generated as the touch time of the touch point.

The touch speed determination module 302 is further configured to determine a variation of a speed of the sliding touch operation according to the touch time of each of the at least three consecutive touch points.

In an implementation, according to touch time of a first touch point, touch time of a second touch point, and touch time of a third touch point, the touch speed determination module 302 calculates a first touch time interval between the touch time of the first touch point and the touch time of the second touch point and a second touch time interval between the touch time of the second touch point and the touch time of the third touch point, where the first touch point, the second touch point, and the third touch point are three consecutive touch points arranged in a direction of the sliding touch operation. When the first touch time interval is longer than the second touch time interval, the touch speed determination module 302 determines that the speed of the sliding touch operation is increased; when the first touch time interval is shorter than the second touch time interval, the touch speed determination module 302 determines that the speed of the sliding touch operation is decreased. For example, it is assumed that the touch time of the first touch point is T1, the touch time of the second touch point is T2, and the touch time of the third touch point is T3, the first touch time interval $\Delta t1$ between the touch time of the first touch point and the touch time of the second touch point is T2-T1, and the second touch time interval $\Delta t2$ between the touch time of the second touch point and the touch time of the third touch point is T3-T2. If $\Delta t1$ is longer than $\Delta t2$, it indicates that touch speed is increased; when $\Delta t1$ is shorter than $\Delta t2$, it indicates that the touch speed is decreased. In this manner, the variation of the speed of the sliding touch operation can be determined, for example, the speed may be continuously increased, or may be first increased and then decreased, or may be first increased, then decreased and finally increased, or the like. In the implementation, the variation of the speed of the sliding touch operation can be accurately determined.

What needs to be illustrated is that, herein the first touch time interval being longer than the second touch time interval does not mean that the first touch time interval is necessarily longer than the second touch time interval, and the first touch time interval being shorter than the second time touch interval does not mean that the first touch time interval is necessarily shorter than the second touch time interval, that is to say, when the first touch time interval is very close to the second touch time interval, it can be deemed that the first touch time interval is equal to the second touch time interval. The touch display device can set a numeric range according to touch accuracy, and when an absolute difference between the first touch time interval and the second touch time interval falls within the numeric range, it can be deemed that the first touch time interval is equal to the second touch time interval. The present embodiment is not limited to a specific numeric range.

In another implementation, when the sliding touch operation is executed on the touch display device, the touch speed determination module 302 obtains touch time of each of three or more consecutive touch points arranged in the direction of the sliding touch operation. For example, the touch time of each of the touch points from the fifth touch point to the tenth touch point is obtained, and sequentially, a touch time interval between each two adjacent touch points is calculated. For example, the touch time interval between the touch time of the sixth touch point and the touch time of the fifth touch point, the touch time interval between the touch time of the seventh touch point and the touch time of the sixth touch point and so on are calculated sequentially. When the touch time intervals are gradually shortened, the touch speed determination module 302 determines that the speed of the sliding touch operation is gradually increased. When the touch time intervals are gradually prolonged, the touch speed determination module 302 determines that the speed of the sliding touch operation is gradually decreased.

The movement speed control module 303 is configured to increase a movement speed of the graphical pointer displayed on the touch display device when the speed of the sliding touch operation is increased, and decrease the movement speed of the graphical pointer when the speed of the sliding touch operation is decreased.

Specifically, the graphical pointer may be any graphical pointer for guiding input, for example, a graphical cursor, a mouse pointer, a focus display on an operation item, or the like.

In an implementation, when the speed of the sliding touch operation is increased, the movement speed control module 303 increases the movement speed of the graphical pointer as follows. The movement speed control module 303 calculates a time difference between the first touch time interval and the second touch time interval, and determines a corresponding movement speed adjustment coefficient according to a first mapping relation, where the first mapping relation is preset, and is a mapping relation between time difference ranges and movement speed adjustment coefficients, each time difference range corresponds to one movement speed adjustment coefficient, and each movement speed adjustment coefficient corresponding to one time difference range is larger than 1. The movement speed control module 303 further increases the movement speed of the graphical pointer according to the corresponding movement speed adjustment coefficient. For example, when the corresponding movement speed adjustment coefficient is 2, the current movement speed of the graphical pointer is doubled to obtain an adjusted movement speed. Obviously, the adjusted movement speed is higher than the movement speed before adjustment. After the movement speed of the graphical pointer is increased, the graphical pointer can be moved substantially to execute a selection operation, such that duration of a movement of the graphical pointer can be reduced, thereby increasing user work efficiency, and improving user experience. In the implementation, when the speed of the sliding touch operation is gradually increased, the movement speed of the graphical pointer is gradually increased, thus the graphical pointer can be moved to a target position quickly.

In another implementation, when the speed of the sliding touch operation is increased, the movement speed control module 303 increases the movement speed of the graphical pointer as follows. The movement speed control module 303 increases the movement speed of the graphical pointer by a preset amplitude when the speed of the sliding touch operation is increased, for example, doubles the movement speed of the graphical pointer. That is to say, in the implementation, the movement speed adjustment coefficient is a fixed value such as 2. After the movement speed of the graphical pointer is increased, the graphical pointer can be moved substantially to execute a selection operation, such that the duration of the movement of the graphical pointer can be reduced, thereby increasing the user work efficiency, and improving the user experience.

In an implementation, when the speed of the sliding touch operation is decreased, the movement speed control module 303 decreases the movement speed of the graphical pointer as follows. The movement speed control module 303 calculates a time difference between the first touch time interval and the second touch time interval, and determines a corresponding movement speed adjustment coefficient according to a second mapping relation, where the second mapping relation is preset, and is a mapping relation between time difference ranges and movement speed adjustment coefficients, each time difference range corresponds to one movement speed adjustment coefficient, and each movement speed adjustment coefficient corresponding to one time difference range is smaller than 1. The movement speed control module 303 further decreases the movement speed of the graphical pointer according to the corresponding movement speed adjustment coefficient. For example, when the corresponding movement speed adjustment coefficient is 0.5, the current movement speed of the graphical pointer is reduced by 50% to obtain an adjusted movement speed. Obviously, the adjusted movement speed is lower than the movement speed before adjustment. After the movement speed of the graphical pointer is decreased, the graphical pointer can be moved slightly to execute a selection operation, such that accurate positioning can be realized, thereby increasing the user work efficiency, and improving the user experience. In the implementation, when the speed of the sliding touch operation is gradually decreased, the movement speed of the graphical pointer is also gradually decreased, thus the graphical pointer can be accurately moved to a target position.

In another implementation, when the speed of the sliding touch operation is decreased, the movement speed control module 303 decreases the movement speed of the graphical pointer as follows. The movement speed control module 303 decreases the movement speed of the graphical pointer by a preset amplitude when the speed of the sliding touch operation is decreased, for example, decreases the movement speed of the graphical pointer by 50%. That is to say, in the implementation, the movement speed adjustment coefficient is a fixed value such as 0.5. After the movement speed of the graphical pointer is decreased, the graphical pointer can be moved slightly to execute a selection operation, such that accurate positioning can be realized, thereby increasing the user work efficiency, and improving the user experience.

Certainly, when the first touch time interval is equal to the second touch time interval, that is, the touch speed is constant, the movement speed control module 303 can keep the movement speed of the graphical pointer unchanged.

In the embodiment, according to the obtained touch time of each of the consecutive touch points, whether the speed of the sliding touch operation is increased or decreased can be determined. When the speed of the sliding touch operation is increased, correspondingly, the movement speed of the graphical pointer is increased, such that the graphical pointer can be moved substantially to execute a selection operation, thereby reducing the duration of the movement of the graphical pointer. When the speed of the sliding touch operation is decreased, correspondingly, the movement speed of the graphical pointer is decreased, such that the graphical pointer can be moved slightly to execute a selection operation, thereby realizing accurate positioning. In the embodiment, the movement speed of the graphical pointer can be adjusted adaptively according to the speed of the sliding touch operation, thereby increasing the user work efficiency, and improving the user experience.

Furthermore, the system 300 for moving the graphical pointer may further include a display content determination module 304 configured to determine whether display content on the touch display device is zoomed in or zoomed out.

Generally, after a web page, an office document (e.g., a word document) or the like is zoomed in or zoomed out, display content thereof is zoomed in or zoomed out, but a page frame is not zoomed in or zoomed out. However, when a picture is zoomed in or zoomed out, content thereof and an outer frame of the picture are both zoomed in or zoomed out. No matter whether the outer frame can be zoomed in or zoomed out, after content thereof is zoomed in or zoomed out, a display resolution is changed. Whether the display content is zoomed in or zoomed out can be determined according to such change of the display content. Certainly, whether the display content is zoomed in or zoomed out can also be determined by determining whether a zoom in operation or a zoom out operation is executed. What needs to be illustrated is that the touch display device can determine which operation is the zoom in operation and which operation is the zoom out operation. For example, when spreading two fingers on the touch display device, it is determined that the zoom in operation is executed; when pinching two fingers on the touch display device, it is determined that the zoom out operation is executed, and not all examples are illustrated herein.

The movement speed control module 303 is further configured to determine a first movement speed adjustment coefficient when the display content is zoomed in, where the first movement speed adjustment coefficient is larger than 1.

The movement speed control module 303 determines the first movement speed adjustment coefficient as follows. The movement speed control module 303 calculates a zoom in proportion of the display content, determines the first movement speed adjustment coefficient according to a third mapping relation, where the third mapping relation is preset, and is a mapping relation between zoom in proportion ranges and movement speed adjustment coefficients, each zoom in proportion range corresponds to one movement speed adjustment coefficient, and each movement speed adjustment coefficient corresponding to one zoom in proportion range is larger than 1.

Alternatively, a display resolution of the display content before the zoom in operation and a display resolution of the display content after the zoom in operation can be obtained. For example, when the display resolution before the zoom in operation is 1600×1200, the display resolution after the zoom in operation is 640×480, that is, the number of pixels displayed horizontally before the zoom in operation is 1600, and the number of pixels displayed vertically before the zoom in operation is 1200; the number of pixels displayed horizontally after the zoom in operation is 640, and the number of pixels displayed vertically after the zoom in operation is 480. The zoom in proportion can be set to be a proportion of the number of the pixels displayed horizontally before the zoom in operation to the number of the pixels displayed horizontally after the zoom in operation. Certainly, the zoom in proportion can also be set to be a proportion of the number of the pixels displayed vertically before the zoom in operation to the number of the pixels displayed vertically after the zoom in operation.

Alternatively, after the zoom in operation, if a display window changes in size, a size of the display window before the zoom in operation and a size of the display window after the zoom in operation can be obtained through a window manager. The zoom in proportion can be set to be a proportion of a length of the display window after the zoom in operation to a length of the display window before the zoom in operation, and can also be set to be a proportion of a height of the display window after the zoom in operation to a height of the display window before the zoom in operation.

The touch operation determination module 301 further determines whether a sliding touch operation is executed on the touch display device after the display content is zoomed in. When the sliding touch operation is executed, and a speed of the sliding touch operation is increased, the movement speed control module 303 determines a second movement speed adjustment coefficient, and adjusts the movement speed of the graphical pointer according to the first movement speed adjustment coefficient and the second movement speed adjustment coefficient, where the second movement speed adjustment coefficient is larger than 1. A specific implementation manner in which the second movement speed adjustment coefficient is determined is the same as that in which the corresponding movement speed adjustment coefficient is determined when the speed of the sliding touch operation is increased, and details are not repeated herein.

According to the first movement speed adjustment coefficient and the second movement speed adjustment coefficient, the movement speed control module 303 adjusts the movement speed of the graphical pointer as follows. The movement speed control module 303 obtains a total adjustment coefficient by adding up the first movement speed adjustment coefficient and the second movement speed adjustment coefficient, and adjusts the movement speed of the graphical pointer according to the total adjustment coefficient.

Furthermore, when the sliding touch operation is executed, and the speed of the sliding touch operation is decreased, a third movement speed adjustment coefficient is obtained, and the movement speed of the graphical pointer is adjusted according to the first movement speed adjustment coefficient and the third movement speed adjustment coefficient, where the third movement speed adjustment coefficient is smaller than 1. A specific implementation manner in which the third movement speed adjustment coefficient is determined is the same as that in which the corresponding movement speed adjustment coefficient is determined when the speed of the sliding touch operation is decreased, and details are not repeated herein.

According to the first movement speed adjustment coefficient and the third movement speed adjustment coefficient, the movement speed control module 303 adjusts the movement speed of the graphical pointer as follows. The movement speed control module 303 obtains a total adjustment coefficient by adding up the first movement speed adjustment coefficient and the third movement speed adjustment coefficient, and adjusts the movement speed of the graphical pointer according to the total adjustment coefficient.

The movement speed control module 303 is further configured to determine a fourth movement speed adjustment coefficient when the display content is zoomed out, where the fourth movement speed adjustment coefficient is smaller than 1.

The movement speed control module 303 determines the fourth movement speed adjustment coefficient as follows. The movement speed control module 303 calculates a zoom out proportion of the display content, and determines the fourth movement speed adjustment coefficient according to a fourth mapping relation, where the fourth mapping relation is preset, and is a mapping relation between zoom out proportion ranges and movement speed adjustment coefficients, each zoom out proportion range corresponds to one movement speed adjustment coefficient, and each movement speed adjustment coefficient corresponding to one zoom out proportion range is smaller than 1.

Alternatively, a display resolution of the display content before a zoom out operation and a display resolution of the display content after the zoom out operation can be obtained, and the zoom out proportion is determined according to the display resolution before the zoom out operation and the display resolution after the zoom out proportion. For example, when the display resolution before the zoom out operation is 640×480, the display resolution after the zoom out operation is 1600×1200, that is, the number of pixels displayed horizontally before the zoom out operation is 640, and the number of pixels displayed vertically before the zoom out operation is 480; the number of pixels displayed horizontally after the zoom out operation is 1600, and the number of pixels displayed vertically after the zoom out operation is 1200. The zoom out proportion can be set to be a proportion of the number of the pixels displayed horizontally before the zoom out operation to the number of the pixels displayed horizontally after the zoom out operation. Certainly, the zoom out proportion can also be set to be a proportion of the number of the pixels displayed vertically before the zoom out operation to the number of the pixels displayed vertically after the zoom out operation.

Alternatively, after the zoom out operation, if a display window changes in size, a size of the display window before the zoom out operation and a size of the display window after the zoom out operation can be obtained through the window manager. The zoom out proportion can be set to be a proportion of a length of the display window after the zoom out operation to a length of the display window before the zoom out operation, and can also be set to be a proportion of a height of the display window after the zoom out operation to a height of the display window before the zoom out operation.

The touch operation determination module 301 further determines whether a sliding touch operation is executed on the touch display device after the display content is zoomed out. When the sliding touch operation is executed, and a speed of the sliding touch operation is increased, the movement speed control module 303 determines a fifth movement speed adjustment coefficient, and adjusts the movement speed of the graphical pointer according to the fourth movement speed adjustment coefficient and the fifth movement speed adjustment coefficient, where the fifth movement speed adjustment coefficient is larger than 1. A specific implementation manner in which the fifth movement speed adjustment coefficient is determined is the same as that in which the corresponding movement speed adjustment coefficient is determined when the speed of the sliding touch operation is increased, and details are not repeated herein.

According to the fourth movement speed adjustment coefficient and the fifth movement speed adjustment coefficient, the movement speed control module 303 adjusts the movement speed of the graphical pointer as follows. The movement speed control module 303 obtains a total adjustment coefficient by adding up the fourth movement speed adjustment coefficient and the fifth movement speed adjustment coefficient, and adjusts the movement speed of the graphical pointer according to the total adjustment coefficient.

Furthermore, when the sliding touch operation is executed, and the speed of the sliding touch operation is decreased, the movement speed control module 303 determines a sixth movement speed adjustment coefficient, and adjusts the movement speed of the graphical pointer according to the fourth movement speed adjustment coefficient and the sixth movement speed adjustment coefficient, where the sixth movement speed adjustment coefficient is smaller than 1. A specific implementation manner in which the sixth movement speed adjustment coefficient is determined is the same as that in which the corresponding movement speed adjustment coefficient is determined when the speed of the sliding touch operation is decreased, and details are not repeated herein.

According to the fourth movement speed adjustment coefficient and the sixth movement speed adjustment coefficient, the movement speed control module 303 adjusts the movement speed of the graphical pointer as follows. The movement speed control module 303 obtains a total adjustment coefficient by adding up the fourth movement speed adjustment coefficient and the sixth movement speed adjustment coefficient, and adjusts the movement speed of the graphical pointer according to the total adjustment coefficient.

Thus, furthermore, when the sliding touch operation is executed after the display content is zoomed in or zoomed out, according to the movement speed adjustment coefficient obtained due to the zoom in operation or the zoom out operation and the movement speed adjustment coefficient obtained according to the variation of the speed of the sliding touch operation, the movement speed of the graphical pointer is determined, such that the movement speed of the graphical pointer can adapt to the change of the display content, thereby reducing the duration of the movement of the graphical pointer when the graphical pointer is moved substantially to execute a selection operation, and realizing accurate positioning when the graphical pointer is moved slightly to execute a selection operation. Therefore, in the embodiment, the user work efficiency can be increased, and the user experience can be improved.

Figure 4:
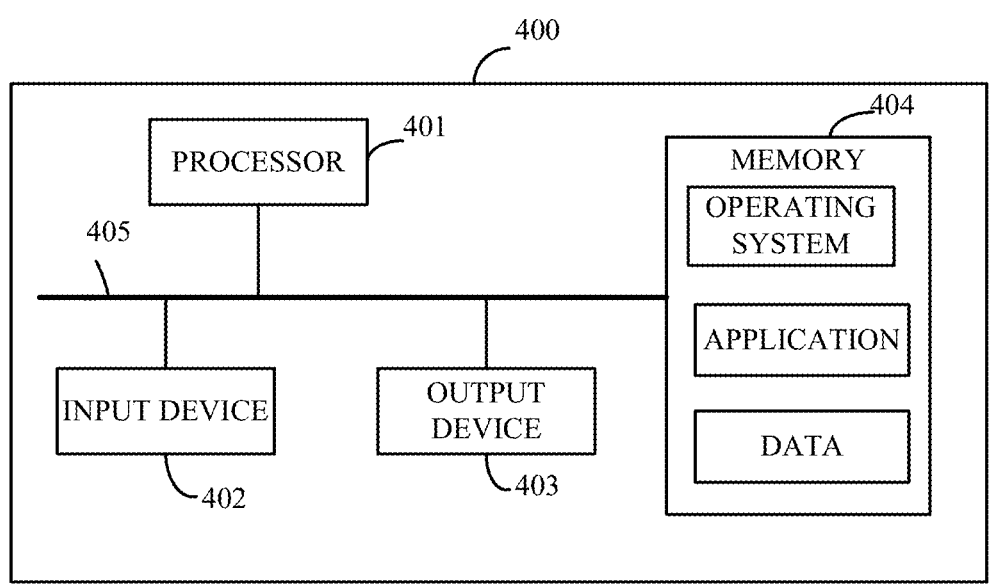
FIG. 4 is a basic structural diagram illustrating a touch display device according to an embodiment of the present disclosure.

Referring to FIG. 4, in an embodiment of the present disclosure, a touch display device 400 can be used to execute the methods for moving the graphical pointer provided in the embodiments of the present disclosure. The touch display device 400 may include at least one processor 401, at least one input device 402, at least one output device 403, a memory 404, and so on. These components communicate with each other via one or more buses 405. A person of ordinary skill in the art can understand that the structure of the touch display device 400 illustrated in FIG. 4 does not limit the present disclosure. The touch display device may be a bus structure or a star structure. The touch display device may include more or fewer components than illustrated, or certain components may be combined, or the touch display device may include different component arrangements.

In the embodiment of the present disclosure, the processor 401 is a control center of the touch display device 400, and connects to various parts of the whole touch display device 400 through various interfaces and lines, runs or executes software programs and/or units stored in the memory 404 and invokes data stored in the memory 404 to perform various functions of the touch display device and process data. The processor 401 may be formed by one or more integrated circuits (ICs). For example, the processor 401 may be formed by a single encapsulated IC, and also may be formed by connection of multiple encapsulated ICs having the same function or different functions. For example, the processor 401 may merely include a CPU, and also may be a combination of the CPU, a digital signal processor (DSP), a graphic processing unit (GPU), and various control chips. In the embodiment of the present disclosure, the CPU may include a signal core, or multiple cores.

In the embodiment of the present disclosure, the input device 402 may include a standard touch screen, a touch pad, a keyboard, and so on, and also may include a wired interface, a wireless interface, and so on, to realize interaction between a user and the touch display device 400.

In the embodiment of the present disclosure, the output device 403 may include a display screen, a loudspeaker, and so on, and may also include a wired interface, a wireless interface, and so on.

In the embodiment of the present disclosure, the memory 404 may include at least one of the following: a random access memory, a nonvolatile memory, and an external memory. The memory 404 may store program codes. The processor 401 performs any of the above methods for moving the graphical pointer by invoking the program codes stored in the memory 404. The memory 404 mainly includes a program storage area and a data storage area. The program storage area may store an operating system, applications for at least one function, and so on. The data storage area may store data created according to usage of the touch display device and so on. In the embodiment of the present disclosure, the operating system may be Android system, iOS system, Windows operating system, or other.

The above disclosures illustrate preferable embodiments of the present disclosure. It should be pointed out that a person of ordinary skill in the art can make several changes and polish without departing from the principle of the present disclosure, and these changes and polish shall be deemed as the scope of protection of the present disclosure.

What is claimed is:

1. A method for moving a graphical pointer displayed on a touch display device, comprising:
    determining whether a sliding touch operation is executed on the touch display device;
    obtaining touch time of each of at least three consecutive touch points based on determining that the sliding touch operation is executed on the touch display device;
    determining a variation of a speed of the sliding touch operation according to the touch time of each of the at least three consecutive touch points;
    increasing a movement speed of the graphical pointer displayed on the touch display device based on determining that the speed of the sliding touch operation is increased; and
    decreasing the movement speed of the graphical pointer based on determining that the speed of the sliding touch operation is decreased.

2. The method of claim 1, wherein determining the variation of the speed of the sliding touch operation according to the touch time of each of the at least three consecutive touch points comprises:
    calculating a first touch time interval between touch time of a first touch point and touch time of a second touch point and a second touch time interval between the touch time of the second touch point and touch time of a third touch point, the first touch point, the second touch point, and the third touch point being three consecutive touch points arranged in a direction of the sliding touch operation;
    determining that the speed of the sliding touch operation is increased when the first touch time interval is longer than the second touch time interval; and
    determining that the speed of the sliding touch operation is decreased when the first touch time interval is shorter than the second touch time interval.

3. The method of claim 2, wherein increasing the movement speed of the graphical pointer based on determining that the speed of the sliding touch operation is increased comprises:
calculating a time difference between the first touch time interval and the second touch time interval;
determining a corresponding movement speed adjustment coefficient according to a mapping relation between time difference ranges and movement speed adjustment coefficients, each of the time difference ranges corresponding to one of the movement speed adjustment coefficients, and each of the movement speed adjustment coefficients being larger than 1; and
increasing the movement speed of the graphical pointer according to the corresponding movement speed adjustment coefficient.

4. The method of claim 2, wherein decreasing the movement speed of the graphical pointer based on determining that the speed of the sliding touch operation is decreased comprises:
calculating a time difference between the first touch time interval and the second touch time interval;
determining a corresponding movement speed adjustment coefficient according to a mapping relation between time difference ranges and movement speed adjustment coefficients, each of the time difference ranges corresponding to one of the movement speed adjustment coefficients, and each of the movement speed adjustment coefficients being smaller than 1; and
decreasing the movement speed of the graphical pointer according to the corresponding movement speed adjustment coefficient.

5. The method of claim 1, further comprising:
determining whether display content on the touch display device is zoomed in;
determining a first movement speed adjustment coefficient based on determining that the display content is zoomed in, the first movement speed adjustment coefficient being larger than 1;
determining whether another sliding touch operation is executed on the touch display device after the display content is zoomed in;
obtaining touch time of each of at least three consecutive touch points touched by the another sliding touch operation based on determining that the another sliding touch operation is executed on the touch display device;
determining a variation of a speed of the another sliding touch operation according to the touch time of each of the at least three consecutive touch points touched by the another sliding touch operation;
determining a second movement speed adjustment coefficient based on determining that the speed of the another sliding touch operation is increased, and adjusting the movement speed of the graphical pointer according to the first movement speed adjustment coefficient and the second movement speed adjustment coefficient, the second movement speed adjustment coefficient being larger than 1; and
determining a third movement speed adjustment coefficient based on determining that the speed of the another sliding touch operation is decreased, and adjusting the movement speed of the graphical pointer according to the first movement speed adjustment coefficient and the third movement speed adjustment coefficient, the third movement speed adjustment coefficient being smaller than 1.

6. The method of claim 5, wherein determining the first movement speed adjustment coefficient comprises:
calculating a zoom in proportion of the display content; and
determining the first movement speed adjustment coefficient according to a mapping relation between zoom in proportion ranges and movement speed adjustment coefficients, each of the zoom in proportion ranges corresponding to one of the movement speed adjustment coefficients, and each of the movement speed adjustment coefficients being larger than 1.

7. The method of claim 1, further comprising:
determining whether display content on the touch display device is zoomed out;
determining a first movement speed adjustment coefficient based on determining that the display content is zoomed out, the first movement speed adjustment coefficient being smaller than 1;
determining whether another sliding touch operation is executed on the touch display device after the display content is zoomed out;
obtaining touch time of each of at least three consecutive touch points touched by the another sliding touch operation based on determining that the another sliding touch operation is executed on the touch display device;
determining a variation of a speed of the another sliding touch operation according to the touch time of each of the at least three consecutive touch points touched by the another sliding touch operation;
determining a second movement speed adjustment coefficient based on determining that the speed of the another sliding touch operation is increased, and adjusting the movement speed of the graphical pointer according to the first movement speed adjustment coefficient and the second movement speed adjustment coefficient, the second movement speed adjustment coefficient being larger than 1; and
determining a third movement speed adjustment coefficient based on determining that the speed of the another sliding touch operation is decreased, and adjusting the movement speed of the graphical pointer according to the first movement speed adjustment coefficient and the third movement speed adjustment coefficient, the third movement speed adjustment coefficient being smaller than 1.

8. The method of claim 7, wherein determining the first movement speed adjustment coefficient comprises:
calculating a zoom out proportion of the display content; and
determining the first movement speed adjustment coefficient according to a mapping relation between zoom out proportion ranges and movement speed adjustment coefficients, each of the zoom out proportion ranges corresponding to one of the movement speed adjustment coefficients, and each of the movement speed adjustment coefficients being smaller than 1.

9. A touch display device, comprising:
at least one processor; and
a computer readable memory, coupled with the at least one processor and storing at least one computer executable instruction therein which, when executed by the at least processor, causes the at least one processor to:
determine whether a sliding touch operation is executed on the touch display device;

obtain touch time of each of at least three consecutive touch points based on a determination that the sliding touch operation is executed on the touch display device;

determine a variation of a speed of the sliding touch operation according to the touch time of each of the at least three consecutive touch points;

increase a movement speed of a graphical pointer displayed on the touch display device based on a determination that the speed of the sliding touch operation is increased; and decrease the movement speed of the graphical pointer displayed on the touch display device based on a determination that the speed of the sliding touch operation is decreased.

10. The touch display device of claim 9, wherein the at least one computer executable instruction causing the at least one processor to determine the variation of the speed of the sliding touch operation according to the touch time of each of the at least three consecutive touch points causes the at least one processor to:

calculate a first touch time interval between touch time of a first touch point and touch time of a second touch point and a second touch time interval between the touch time of the second touch point and touch time of a third touch point wherein the first touch point, the second touch point, and the third touch point are three consecutive touch points arranged in a direction of the sliding touch operation;

determine that the speed of the sliding touch operation is increased when the first touch time interval is longer than the second touch time interval; and determine that the speed of the sliding touch operation is decreased when the first touch time interval is shorter than the second touch time interval.

11. The touch display device of claim 10, wherein the at least one computer executable instruction causing the at least one processor to increase the movement speed of the graphical pointer based on the determination that the speed of the sliding touch operation is increased causes the at least one processor to:

calculate a time difference between the first touch time interval and the second touch time interval;

determine a corresponding movement speed adjustment coefficient according to a mapping relation between time difference ranges and movement speed adjustment coefficients, wherein each of the time difference ranges corresponds to one of the movement speed adjustment coefficients, and each of the movement speed adjustment coefficients is larger than 1; and increase the movement speed of the graphical pointer according to the corresponding movement speed adjustment coefficient.

12. The touch display device of claim 10, wherein the at least one computer executable instruction causing the at least one processor to decrease the movement speed of the graphical pointer based on the determination that the speed of the sliding touch operation is decreased causes the at least one processor to:

calculate a time difference between the first touch time interval and the second touch time interval;

determine a corresponding movement speed adjustment coefficient according to a mapping relation between time difference ranges and movement speed adjustment coefficients, wherein each of the time difference ranges corresponds to one of the movement speed adjustment coefficients, and each of the movement speed adjustment coefficients is smaller than 1; and decrease the movement speed of the graphical pointer according to the corresponding movement speed adjustment coefficient.

13. The touch display device of claim 9, wherein the at least one computer executable instruction further causes the at least one processor to:

determine whether display content on the touch display device is zoomed in;

determine a first movement speed adjustment coefficient based on a determination that the display content is zoomed in, wherein the first movement speed adjustment coefficient is larger than one;

determine whether another sliding touch operation is executed on the touch display device after the display content is zoomed in;

obtain touch time of each of at least three consecutive touch points touched by the another sliding touch operation based on a determination that the another sliding touch operation is executed on the touch display device;

determine a variation of a speed of the another sliding touch operation according to the touch time of each of the at least three consecutive touch points touched by the another sliding touch operation;

determine a second movement speed adjustment coefficient based on a determination that the speed of the another sliding touch operation is increased, and adjust the movement speed of the graphical pointer according to the first movement speed adjustment coefficient and the second movement speed adjustment coefficient, wherein the second movement speed adjustment coefficient is larger than 1; and determine a third movement speed adjustment coefficient based on a determination that the speed of the another sliding touch operation is decreased, and adjust the movement speed of the graphical pointer according to the first movement speed adjustment coefficient and the third movement speed adjustment coefficient, wherein the third movement speed adjustment coefficient is smaller than 1.

14. The touch display device of claim 9, wherein the at least one computer executable instruction further causes the at least one processor to:

determine whether display content on the touch display device is zoomed out;

determine a first movement speed adjustment coefficient based on a determination that the display content is zoomed out, wherein the first movement speed adjustment coefficient is smaller than 1;

determine whether another sliding touch operation is executed on the touch display device after the display content is zoomed out;

obtain touch time of each of at least three consecutive touch points touched by the another sliding touch operation based on a determination that the another sliding touch operation is executed on the touch display device;

determine a variation of a speed of the another sliding touch operation according to the touch time of each of the at least three consecutive touch points touched by the another sliding touch operation;

determine a second movement speed adjustment coefficient based on a determination that the speed of the another sliding touch operation is increased, and adjust the movement speed of the graphical pointer according to the first movement speed adjustment coefficient and the second movement speed adjustment coefficient, wherein the second movement speed adjustment coefficient is larger than 1; and determine a third movement speed adjustment coefficient based on a determination that the speed of the another sliding touch operation is decreased, and adjust the movement speed of the graphical pointer according to the first movement speed adjustment coefficient and the third movement speed adjustment coefficient, wherein the third movement speed adjustment coefficient is smaller than 1.

15. A non-transitory computer-readable storage medium storing at least one computer executable instruction which, when executed by at least one processor, causes the at least one processor to carry out actions, comprising:

determining whether a sliding touch operation is executed on a touch display device;

obtaining touch time of each of at least three consecutive touch points based on determining that the sliding touch operation is executed on the touch display device;

determining a variation of a speed of the sliding touch operation according to the touch time of each of the at least three consecutive touch points;

increasing a movement speed of a graphical pointer displayed on the touch display device based on determining that the speed of the sliding touch operation is increased; and decreasing the movement speed of the graphical pointer based on determining that the speed of the sliding touch operation is decreased.

16. The non-transitory computer-readable storage medium of claim 15, wherein the at least one computer executable instruction executed by the at least one processor to carry out the action of determining the variation of the speed of the sliding touch operation according to the touch time of each of the at least three consecutive touch points is executed by the at least one processor to carry out actions, comprising:

calculating a first touch time interval between touch time of a first touch point and touch time of a second touch point and a second touch time interval between the touch time of the second touch point and touch time of a third touch point, the first touch point, the second touch point, and the third touch point being three consecutive touch points arranged in a direction of the sliding touch operation;

determining that the speed of the sliding touch operation is increased when the first touch time interval is longer than the second touch time interval; and determining that the speed of the sliding touch operation is decreased when the first touch time interval is shorter than the second touch time interval.

17. The non-transitory computer-readable storage medium of claim 16, wherein the at least one computer executable instruction executed by the at least one processor to carry out the action of increasing the movement speed of the graphical pointer based on determining that the speed of the sliding touch operation is increased is executed by the at least one processor to carry out actions, comprising:

calculating a time difference between the first touch time interval and the second touch time interval;

determining a corresponding movement speed adjustment coefficient according to a mapping relation between time difference ranges and movement speed adjustment coefficients, each of the time difference ranges corresponding to one of the movement speed adjustment coefficients, and each of the movement speed adjustment coefficients being larger than 1; and increasing the movement speed of the graphical pointer according to the corresponding movement speed adjustment coefficient.

18. The non-transitory computer-readable storage medium of claim 16, wherein the at least one computer executable instruction executed by the at least one processor to carry out the action of decreasing the movement speed of the graphical pointer based on determining that the speed of the sliding touch operation is decreased is executed by the at least one processor to carry out actions, comprising:

calculating a time difference between the first touch time interval and the second touch time interval;

determining a corresponding movement speed adjustment coefficient according to a mapping relation between time difference ranges and movement speed adjustment coefficients, each of the time difference ranges corresponding to one of the movement speed adjustment coefficients, and each of the movement speed adjustment coefficients being smaller than 1; and decreasing the movement speed of the graphical pointer according to the corresponding movement speed adjustment coefficient.

19. The non-transitory computer-readable storage medium of claim 15, wherein the at least one computer executable instruction is further executed by the at least one processor to carry out actions, comprising:

determining whether display content on the touch display device is zoomed in;

determining a first movement speed adjustment coefficient based on determining that the display content is zoomed in, the first movement speed adjustment coefficient being larger than 1;

determining whether another sliding touch operation is executed on the touch display device after the display content is zoomed in;

obtaining touch time of each of at least three consecutive touch points touched by the another sliding touch operation based on determining that the another sliding touch operation is executed on the touch display device;

determining a variation of a speed of the another sliding touch operation according to the touch time of each of the at least three consecutive touch points touched by the another sliding touch operation;

determining a second movement speed adjustment coefficient based on determining that the speed of the another sliding touch operation is increased, and adjusting the movement speed of the graphical pointer according to the first movement speed adjustment coefficient and the second movement speed adjustment coefficient, the second movement speed adjustment coefficient being larger than 1; and determining a third movement speed adjustment coefficient based on determining that the speed of the another sliding touch operation is decreased, and adjusting the movement speed of the graphical pointer according to the first movement speed adjustment coefficient and the third movement speed adjustment coefficient, the third movement speed adjustment coefficient being smaller than 1.

20. The non-transitory computer-readable storage medium of claim 15, wherein the at least one computer executable instruction is further executed by the at least one processor to carry out actions, comprising:

determining whether display content on the touch display device is zoomed out;
determining a first movement speed adjustment coefficient based on determining that the display content is zoomed out, the first movement speed adjustment coefficient being smaller than 1;
determining whether another sliding touch operation is executed on the touch display device after the display content is zoomed out;
obtaining touch time of each of at least three consecutive touch points touched by the another sliding touch operation based on determining that the another sliding touch operation is executed on the touch display device;
determining a variation of a speed of the another sliding touch operation according to the touch time of each of the at least three consecutive touch points touched by the another sliding touch operation;
determining a second movement speed adjustment coefficient based on determining that the speed of the another sliding touch operation is increased, and adjusting the movement speed of the graphical pointer according to the first movement speed adjustment coefficient and the second movement speed adjustment coefficient, the second movement speed adjustment coefficient being larger than 1; and
determining a third movement speed adjustment coefficient based on determining that the speed of the another sliding touch operation is decreased, and adjusting the movement speed of the graphical pointer according to the first movement speed adjustment coefficient and the third movement speed adjustment coefficient, the third movement speed adjustment coefficient being smaller than 1.

* * * * *